United States Patent
Wernli et al.

(10) Patent No.: US 6,961,657 B1
(45) Date of Patent: Nov. 1, 2005

(54) SUBMARINE LAUNCHED EXPENDABLE RADIO NAVIGATION BUOY SYSTEM

(75) Inventors: Robert L. Wernli, San Diego, CA (US); Steven J. Cowen, San Diego, CA (US); Jimmy L. Held, San Diego, CA (US); Gerald R. Mackelburg, San Diego, CA (US); Donald M. Rosencrantz, San Diego, CA (US); Aaron R. Braun, El Cajon, CA (US); Gary D. Murphy, Spring Valley, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 237 days.

(21) Appl. No.: 10/648,104

(22) Filed: Aug. 26, 2003

(51) Int. Cl.[7] .............................................. G01C 21/00
(52) U.S. Cl. ........................... 701/207; 367/4; 367/131
(58) Field of Search ................................ 701/200, 207; 367/3, 4, 131, 134; 73/170.29, 170.34

(56) References Cited

U.S. PATENT DOCUMENTS

| | | | |
|---|---|---|---|
| 3,582,871 A | * | 6/1971 | Synder ........................... 367/3 |
| 4,794,575 A | | 12/1988 | Miller |
| 5,046,359 A | | 9/1991 | Layport |
| 5,319,376 A | | 6/1994 | Eninger |
| 5,642,330 A | * | 6/1997 | Santopietro ................. 367/131 |
| 6,494,159 B2 | * | 12/2002 | Sirmalis et al. ............. 114/312 |
| 6,687,186 B1 | * | 2/2004 | Fields ........................... 367/4 |

* cited by examiner

Primary Examiner—Gary Chin
(74) Attorney, Agent, or Firm—Allan Y. Lee; Michael A. Kagan; Peter A. Lipovsky

(57) ABSTRACT

A submarine launched expendable radio navigation system (SSXRN) buoy method and apparatus. According to one embodiment, a method for determining a submarine geographic position using a SSXRN buoy system is disclosed. The method comprising launching a radio navigation-enabled buoy and recording a launch time and DRNS submarine position. The method further comprises recording a buoy breach time and searching for radio navigation RF signals. Then, recording a radio navigation position acquisition time and an initial radio navigation position. Further, recording a subsequent radio navigation position data and a subsequent time. Moreover, determining a DRNS correction factor using a DRNS position error, a buoy drift, radio navigation position data and DRNS position data. In addition, estimating the submarine geographic position using the DRNS correction factor and a DRNS geographic position. In another embodiment, a SSXRN buoy system is disclosed.

20 Claims, 7 Drawing Sheets

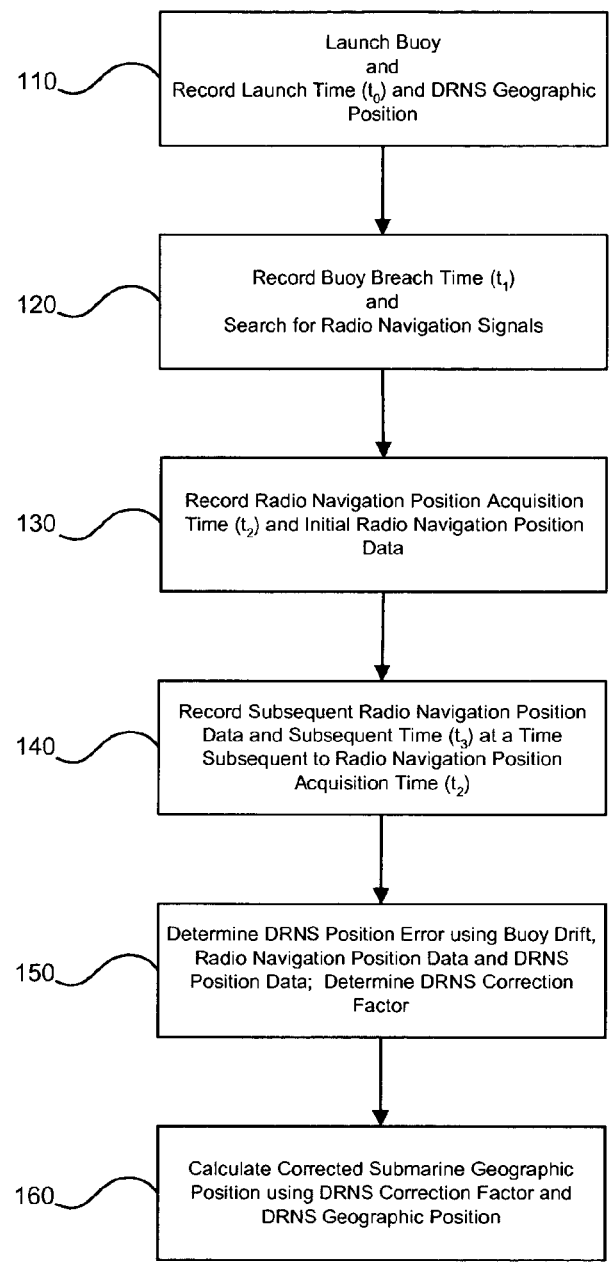

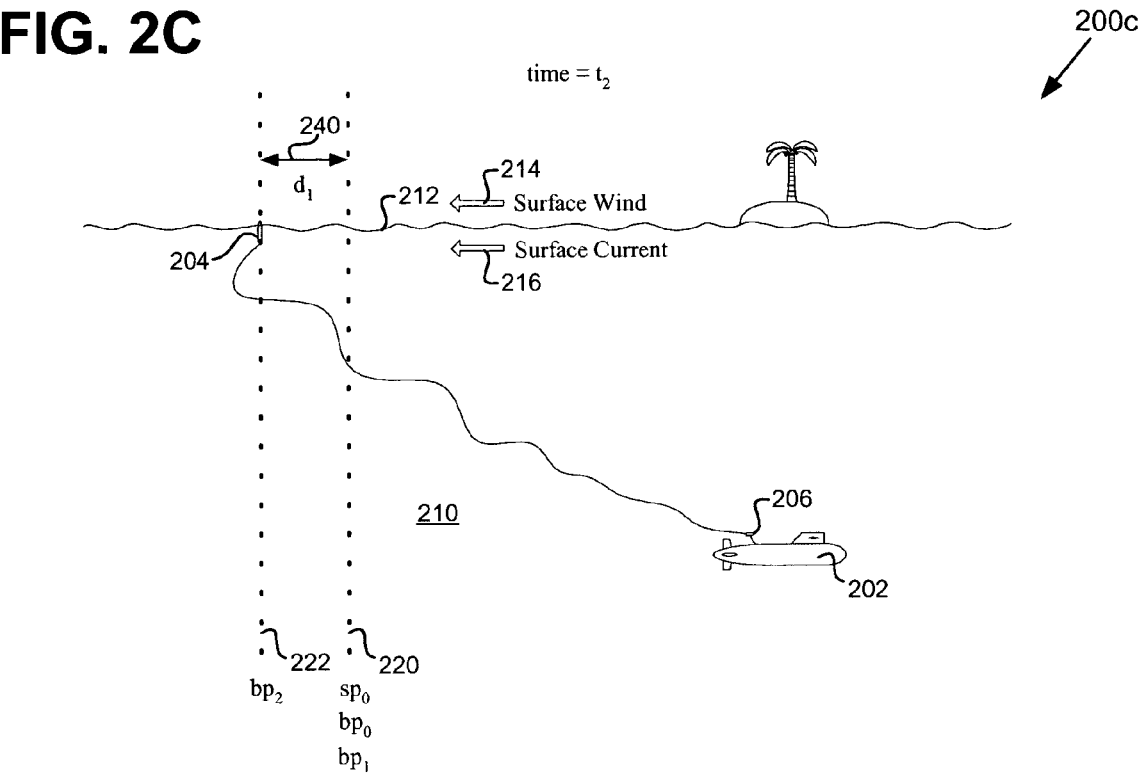
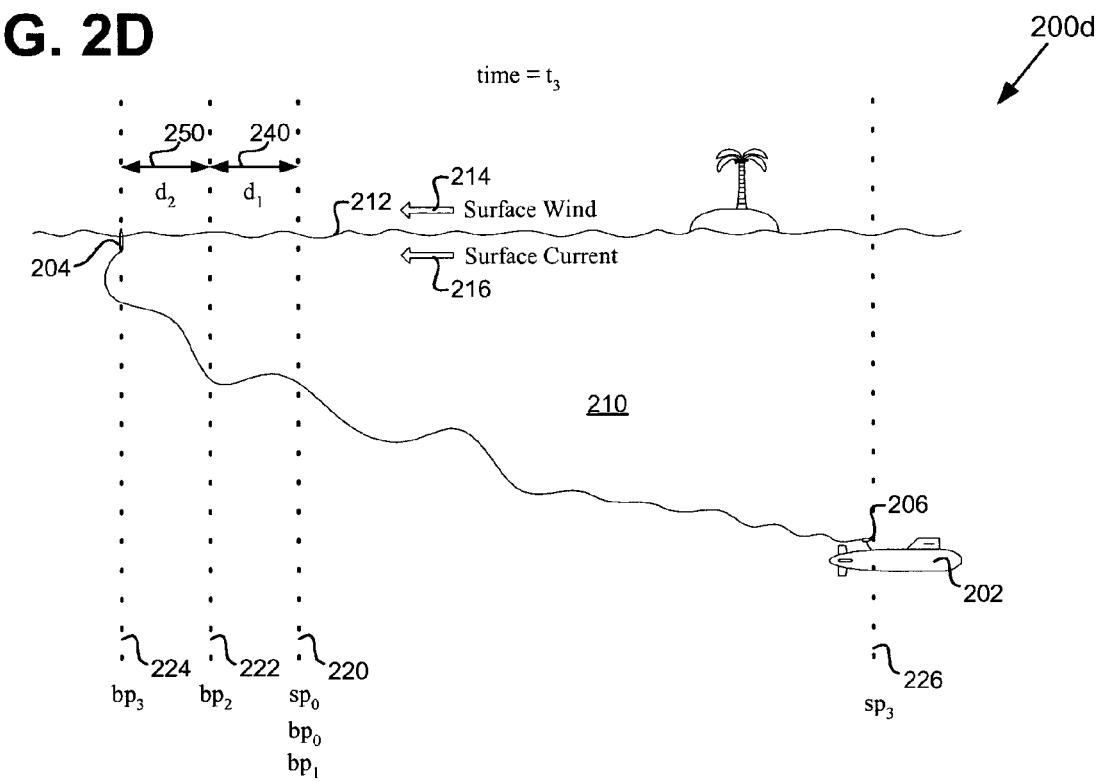

SUBMARINE LAUNCHED EXPENDABLE RADIO NAVIGATION BUOY SYSTEM

BACKGROUND OF THE INVENTION

The present invention is generally in the field of submarine navigation. More specifically, the invention is in the field of submarine navigation using submarine launched expendable radio navigation buoy systems.

Modern submarines are equipped with "dead reckoning" (DR) navigation systems to enable them to estimate their geographic position (i.e., latitude and longitude) when submerged. Dead reckoning is a method of determining the position of a vessel via compass readings and distances traveled. Exemplary DR navigation systems include inertial navigation systems, Doppler sonar systems and speed log systems, which are used in conjunction with a compass to determine DR geographic position estimates. Due to inherent measurement inaccuracies, dead reckoning navigation systems suffer from errors that accumulate with time and distance traveled.

The inertial navigation system (INS) is an exemplary DR navigation system, which calculates geographic displacements by measuring accelerations. Inertial navigation systems are particularly useful for submarines that remain submerged for extended periods. In INS, the DR geographic position estimate of a submarine can be determined by summing INS displacement measurements relative to an accurate geographic position fix (e.g., departure port). Due to inherent inaccuracies in INS acceleration measurements, total error of the INS estimated geographic position of the submarine increases with time. To maintain adequate geographic positional accuracy, submarines must periodically acquire geographic position updates from an external source to calibrate their internal navigation systems.

An exemplary and popular known source of geographic position information is the Global Positioning System (GPS), which uses multiple orbiting satellites to provide geographic position data to GPS receivers via radio frequency (RF) signals. GPS receivers require RF signal contact with a minimum of three different satellites to obtain geographic position data. In general, the accuracy of geographic position data of a GPS receiver increases as the RF signal contact with different satellites increases. Thus, modern GPS receivers commonly have eight or more receiver channels for receiving and processing satellite RF signals from a large number of satellites. Alternate sources of RF navigation signals are also available throughout the world. An exemplary source of RF navigation signals that is operated by Russia is the Global Orbiting Navigation Satellite System (GLONASS). Another exemplary source is the Galileo System that is under development by the European Union.

Military submarines rely heavily upon stealth to be effective combat vessels in times of war and deterrents in times of peace. Surfaced (i.e., un-submerged) submarines can be easily detected visually (e.g., satellite photography) and electronically (e.g., radar). Thus, military submarines remain submerged for extended periods, during which updates of geographic position information may be required. Radio frequency signal propagation through water is greatly attenuated, and thus, receiver antennas must be above the water surface in order to receive RF signals. Typically, submerged submarines must ascend to a depth relatively close to the ocean surface to receive updated geographic position data via antennas, which they extend above the ocean surface. Disadvantageously, this process can be time consuming and is an inherently dangerous procedure. Also, surfaced or nearly surfaced submarines with extended antennas can be more easily detected than submarines at depth. Thus, methods have been developed for submerged submarines to obtain updated geographic position data while remaining submerged.

A method for submerged submarines to obtain updated geographic position data while remaining submerged is described in detail in U.S. Pat. No. 5,319,376, issued on Jun. 7, 1994 to James Eniger, which is hereby incorporated by reference in its entirety for its teachings on submarine navigation systems, submarine buoys and GPS, and is referred to hereinafter as "Eniger '376". The method of Eniger '376 begins by releasing an arctic buoy from a submerged submarine. The arctic buoy rises until it encounters ice floating on the ocean surface. The artic buoy penetrates the ice, deploys a GPS antenna into the air above the ice surface and receives RF signals from GPS satellites. The arctic buoy transmits geographic position information to the submerged submarine via a data link such as a fiber optic or electric cable. Disadvantageously, the method of Eniger '376 does not correct for inaccuracies in geographic position information due to buoy drift (i.e., latitude and longitude displacement over time of a buoy due to ocean surface wind and current), which is normally encountered on the ocean surface. In addition, the Eniger '376 approach does not correct for submarine geographic displacement that occurs while the buoy is acquiring geographic position, which increases inaccuracies in geographic position information.

Therefore, a need exists for submarine launched expendable radio navigation buoy systems that can provide highly accurate geographic positions. Specifically, a need exists for submarine launched expendable radio navigation buoy systems that provide correction for submarine and buoy geographic displacements while the buoy is acquiring geographic position.

SUMMARY OF THE INVENTION

The present invention is directed to a method and apparatus for a submarine launched expendable radio navigation buoy system. The invention overcomes the need in the art for submarine launched expendable radio navigation buoy systems that provide highly accurate geographic information and provide correction for submarine and buoy geographic displacements while the buoy is acquiring geographic position. The present inventive buoy system method and apparatus uses buoy drift and DR geographic position estimates to correct for dead reckoning navigation system (DRNS) inaccuracies.

According to one embodiment, the present invention is a method for determining a submarine geographic position using a radio navigation buoy system. The method comprises a step of launching a radio navigation-enabled buoy and recording a launch time and a DRNS geographic position estimate. The method further comprises recording a buoy breach time and searching for radio navigation RF signals. Then, recording a radio navigation position acquisition time and an initial radio navigation position data. Further, recording a subsequent radio navigation position and a subsequent time. Moreover, determining a DRNS correction factor using a DRNS position error, a buoy drift, radio navigation position data and DRNS position data. In addition, estimating the submarine geographic position using the DRNS correction factor and a DRNS geographic position.

According to another embodiment, the present invention is a radio navigation buoy system, which includes a submarine launched expendable radio navigation buoy and a processing means. The submarine launched radio navigation buoy is capable of launching from a submerged submarine, obtaining a plurality of radio navigation positions from radio navigation RF signals and a plurality of corresponding event times, transmitting the plurality of corresponding event times and the plurality of radio navigation positions. The processing means is capable of receiving the plurality of corresponding event times and the plurality of radio navigation positions, determining a DRNS correction factor using a DRNS position error, a buoy drift, radio navigation position data and DRNS position data, and estimating a submarine geographic position using the DRNS correction factor and a DRNS geographic position.

The previously summarized features and advantages along with other aspects of the present invention will become clearer upon review of the following specification taken together with the included drawings.

BRIEF DESCRIPTION OF THE DRAWINGS

FIG. 1 is a flowchart of an exemplary method that implements an embodiment of the invention.

FIG. 2C is a pictorial illustration side view of an intermediate step of an exemplary method that implements an embodiment of the invention.

FIG. 2D is a pictorial illustration side view of an intermediate step of an exemplary method that implements an embodiment of the invention.

DETAILED DESCRIPTION OF THE INVENTION

The present invention is directed to submarine launched expendable radio navigation buoy systems. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

The present inventive submarine launched expendable radio navigation (SSXRN) buoy system uses buoy geographic position and buoy drift (i.e., latitude and longitude displacement over time of a buoy due to ocean surface wind and current) measurements to determine a dead reckoning navigation system (DRNS) geographic position error, which can be used to calculate a DRNS correction factor. Buoy geographic position and buoy drift can be estimated from radio navigation systems such as GPS. Corrected DRNS submarine geographic position estimates can be determined with high accuracy using the DRNS correction factor and DRNS geographic position estimates. The method is particularly useful for military submarines. In one embodiment, the DRNS of the submarine is an inertial navigation system (INS).

FIG. 1 is a flowchart of an exemplary method that implements an embodiment of the invention. Certain details and features have been left out of flowchart 100 of FIG. 1 that are apparent to a person of ordinary skill in the art. For example, a step may consist of one or more sub-steps or may involve specialized equipment or materials, as known in the art. While STEPS 110 through 160 shown in flowchart 100 are sufficient to describe one embodiment of the present invention, other embodiments of the invention may utilize steps different from those shown in flowchart 100. These steps are described in greater detail below in relation to pictorial illustrations 200a–200d of FIGS. 2A–2D, respectively.

Figure 2A:
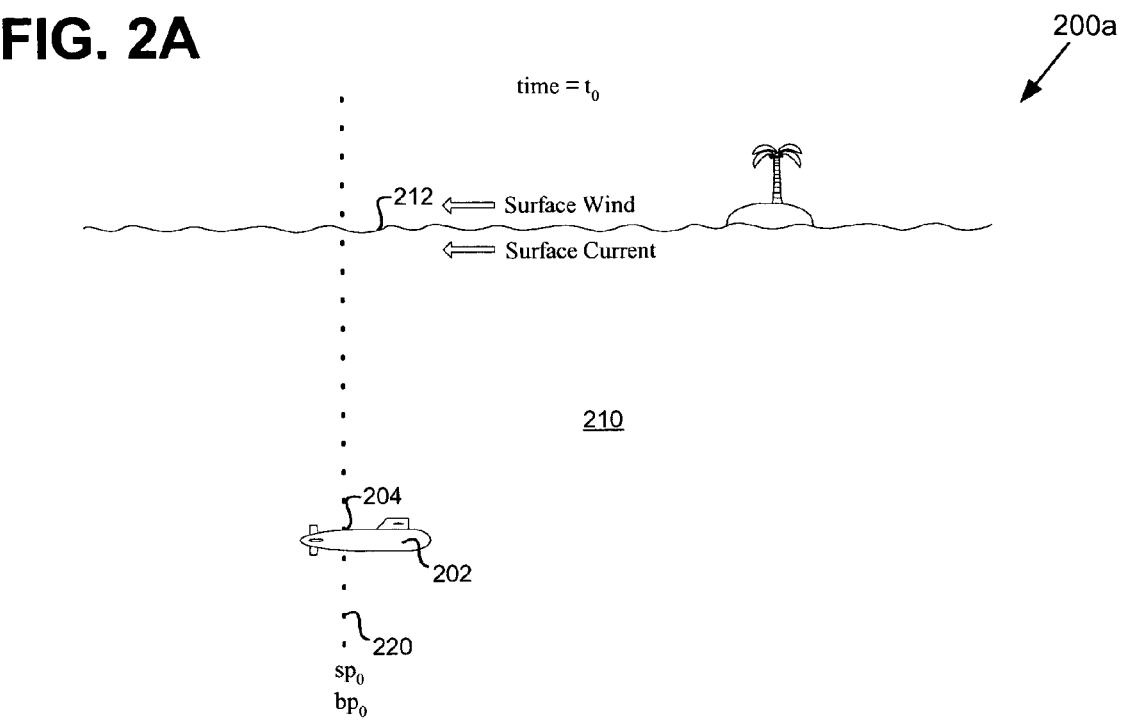
FIG. 2A is a pictorial illustration side view of an intermediate step of an exemplary method that implements an embodiment of the invention.

FIGS. 2A–2D are pictorial illustration side views of some of the steps of an exemplary method that implements an embodiment of the invention. These pictorial illustration side views show some of the geographic positions of a submarine and a radio navigation-enabled buoy of an embodiment of the invention. Referring to FIGS. 1 and 2A, at STEP 110 in flowchart 100, the method launches a radio navigation-enabled buoy from a submerged submarine and records the launch time, which is also referred to as time to. In addition, the method records DRNS geographic position (i.e., latitude and longitude of the submerged submarine according to its dead reckoning navigation system). In one embodiment, the DRNS geographic position is obtained from an INS. A radio navigation-enabled buoy includes a radio navigation receiver and antenna. In one embodiment, the radio navigation-enabled buoy is a GPS-enabled buoy, which includes a GPS receiver and antenna. As shown in pictorial illustration side view 200a of FIG. 2A, submarine 202 is submerged below ocean surface 212 of ocean 210. Submarine 202 launches radio navigation-enabled buoy 204 at time to. Submarine 202 and GPS-enabled buoy 204 are located at geographic position 220, which is represented by a vertical dashed line. Geographic position 220 can also be referred to as "submarine latitude/longitude position at time to" ($sp_0$) or "buoy latitude/longitude position at time $t_0$" ($bp_0$). Radio navigation-enabled buoy 204 is designed to ascend to ocean surface 212 in a substantially straight vertical manner. Thus, after buoy launching of STEP 110 of FIG. 1, radio navigation-enabled buoy 204 does not appreciably deviate from geographic position 220 during ascent. After STEP 110, the method of flowchart 100 of FIG. 1 proceeds to STEP 120.

Figure 2B:
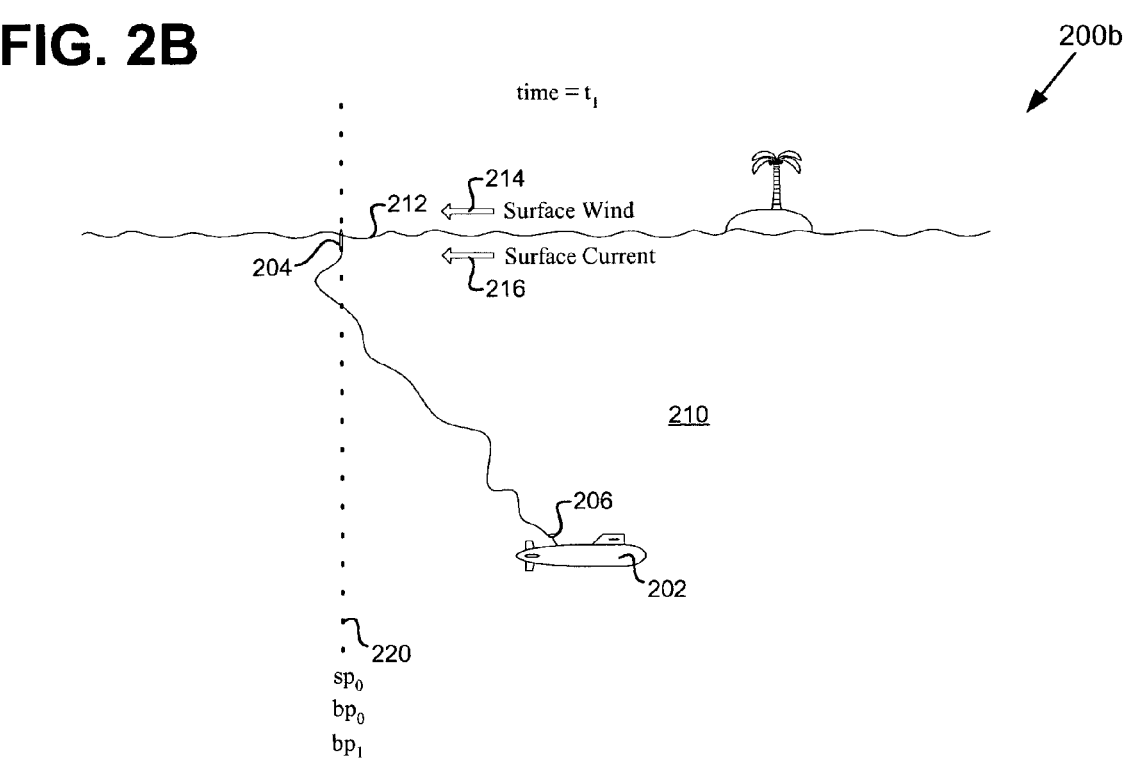
FIG. 2B is a pictorial illustration side view of an intermediate step of an exemplary method that implements an embodiment of the invention.

Referring to FIGS. 1 and 2B, at STEP 120 in flowchart 100, the method records buoy breach time, which is also referred to as time $t_1$, and searches for radio navigation RF signals. As shown in pictorial illustration side view 200b of FIG. 2B, radio navigation-enabled buoy 204 breaches ocean surface 212 at geographic position 220 at time $t_1$. As shown in FIG. 2B, geographic position 220 can be referred to as "buoy latitude/longitude position at time $t_1$" (bp1). Thus, geographic position 220 can be referred to as $sp_0$, $bp_0$ and $bp_1$. In one embodiment, radio navigation-enabled buoy 204 is coupled to lifting body 206 via a signal wire; and lifting body 206 is coupled to submarine 202 via a tether wire. The radio navigation-enabled buoy 204 and lifting body 206 configuration allows radio navigation-enabled buoy 204 to ascend in a substantially straight vertical manner while submarine 202 travels through ocean 210. An exemplary radio navigation-enabled buoy 204 and lifting body 206 are elements of a modified SSXBT submarine launched expendable buoy system, which is described in greater detail below in relation to FIG. 5. After breaching ocean surface 212, radio navigation-enabled buoy 204 searches for radio navigation RF signals. Radio navigation-enabled buoy 204, just as all receivers, requires "position acquisition" to determine global position data via radio navigation. Position acquisition refers to obtaining the minimum number of signals to obtain reliable geographic position data. In GPS, position acquisition is referred to as "satellite position acquisition". Thus, satellite position acquisition refers to obtaining the minimum number of signals to obtain reliable geographic position data, which is at least three GPS satellite RF signals. In GPS, satellite position acquisition typically occurs approximately two minutes after starting a GPS satellite RF signal search. Once radio navigation-enabled buoy 204 breaches ocean surface 212, it is subject to move with reference to latitude and longitude due to surface wind and surface current, which are represented by arrows 214 and 216, respectively. After STEP 120, the method of flowchart 100 of FIG. 1 proceeds to STEP 130.

Referring to FIGS. 1 and 2C, at STEP 130 in flowchart 100, the method records radio navigation position acquisition time, which is also referred to as time $t_2$, and initial radio navigation position data. Time $t_2$ is subsequent to time $t_1$. As shown in pictorial illustration side view 200c of FIG. 2C, at time $t_2$, radio navigation-enabled buoy 204 is located at geographic position 222, which can also be referred to as "buoy latitude/longitude position at time $t_2$" (bp2). From time $t_1$ to time $t_2$, radio navigation-enabled buoy 204 drifts from geographic position 220 to geographic position 222 due to surface wind 214 and surface current 216. In one embodiment, the period between time $t_1$ and time $t_2$ ranges between approximately 2 minutes and approximately 4 minutes. The geographic displacement of radio navigation-enabled buoy 204 during time $t_1$ and time $t_2$ (i.e., distance between geographic position 220 and geographic position 222) can be represented by a latitude difference and a longitude difference. The buoy drift can be represented by a latitude difference over time and a longitude difference over time. The geographic displacement of radio navigation-enabled buoy 204 during time $t_1$ and time $t_2$ can also be represented by a distance ($d_1$), which is represented by arrow 240, and a bearing. Initial radio navigation position data from radio navigation sources such as GPS satellites provides radio navigation-enabled buoy 204 with a radio navigation estimate of the latitude and longitude of geographic position 222. Submarine 202 continues to travel through ocean 210. After STEP 130, the method of flowchart 100 of FIG. 1 proceeds to STEP 140.

Referring to FIGS. 1 and 2D, at STEP 140 in flowchart 100, the method records radio navigation position data, which is referred to as "subsequent radio navigation position data", and time $t_3$, which is also referred to as subsequent time. Time $t_3$ is subsequent to time $t_2$. In one embodiment, the period between time $t_2$ and time $t_3$ ranges between approximately 3 minutes and approximately 4 minutes. As shown in pictorial illustration side view 200d of FIG. 2D, at time $t_3$, radio navigation-enabled buoy 204 is located at geographic position 224, which can also be referred to as "buoy latitude/longitude position at time $t_3$" (bp3). From time $t_2$ to time $t_3$, radio navigation-enabled buoy 204 drifts from geographic position 222 to geographic position 224 due to surface wind 214 and surface current 216. The geographic displacement of radio navigation-enabled buoy 204 during time $t_2$ and time $t_3$ (i.e., distance between geographic position 222 and geographic position 224) can be represented as a latitude difference and longitude difference or a distance ($d_2$), which is represented by arrow 250, and a bearing. Radio navigation RF signals provide radio navigation-enabled buoy 204 with a radio navigation estimate of the latitude and longitude of geographic position 224 (i.e., subsequent radio navigation position data). Submarine 202 continues to travel through ocean 210 to geographic position 226, which can also be referred to as "submarine latitude/longitude position at time $t_3$" (sp3). After STEP 140, the method of flowchart 100 of FIG. 1 proceeds to STEP 150.

Referring to FIG. 1, at STEP 150 in flowchart 100, the method determines a DRNS position error using buoy drift, radio navigation position data and DRNS position data. In one embodiment, DRNS position data is obtained from an INS. Buoy drift can be represented by a latitude velocity and a longitude velocity. In addition, the method determines a DRNS correction factor based on the DRNS position error. The DRNS position error refers to the difference between a radio navigation/drift estimated geographic position (i.e., submarine latitude and longitude estimated using radio navigation data and buoy drift) and DRNS estimated geographic position (i.e., submarine latitude and longitude estimated by DRNS) at a given time (e.g., time $t_0$). According to the invention, the method extrapolates a radio navigation/drift estimated geographic position based on buoy drift and radio navigation position data.

In one embodiment of STEP 150, the DRNS position error is determined by calculating the difference between a radio navigation/drift estimated geographic position of buoy 204 at time $t_1$ and a DRNS estimated geographic position of submarine 202 at time $t_0$ because these geographic positions should be approximately equal due to the relatively straight vertical ascent of buoy 204. According to the invention, the method extrapolates a radio navigation/drift estimated geographic position of buoy 204 at time $t_1$ using radio navigation position data and buoy drift measurements. In one embodiment, the method extrapolates a radio navigation/drift estimated position of buoy 204 based on radio navigation position data received at time $t_2$ and time $t_3$ and an assumption that buoy drift due to surface wind and surface current during the relatively short duration between time $t_1$ and time $t_3$ is approximately constant. By comparing a radio navigation estimate of geographic position 222 to a radio navigation estimate of geographic position 224 and times $t_2$ to $t_3$, the method calculates buoy drift or latitude/longitude displacement over time, which is used to extrapolate a radio navigation/drift estimate of geographic position 220. In one embodiment, the method extrapolates a radio navigation/drift estimated geographic position of buoy 204 at time $t_1$ (i.e., geographic position 220) by multiplying buoy drift by an elapsed time (i.e., time $t_1$ subtracted from time $t_2$) to obtain estimated latitude and longitude displacements and subtracting the estimated latitude and longitude displacements from the radio navigation estimate of geographic position 222. One of ordinary skill in the art shall recognize that a higher number of time instants and radio navigation position estimates can be used to more accurately obtain the buoy drift without departing from the scope or spirit of the present invention. The method determines a DRNS position error by comparing a radio navigation/drift estimated geographic position of buoy 204 at time $t_1$ to a DRNS estimated geographic position of submarine 202 at time $t_0$. In one embodiment, the DRNS position error is given in latitude and longitude. Further at STEP 150, the method determines a DRNS correction factor based on the DRNS position error. In one embodiment, the DRNS correction factor has units of latitude and longitude.

In one embodiment, the method proceeds from STEP 130 directly to STEP 150 thereby skipping STEP 140. In this embodiment, the method determines buoy drift and buoy geographic position from alternative means. In one embodiment, the method receives buoy drift and buoy geographic position from a DRNS associated with buoy 204 (e.g., a DRNS disposed within buoy 204). In one embodiment, the method receives buoy drift and buoy geographic position of buoy 204 from a sonar system capable of tracking buoy 204 (e.g., a sonar system of submarine 202).

In an example of STEP 150, time $t_1$ equals 10:11 (i.e., 11 minutes past 10AM), time $t_2$ equals 10:13 and time $t_3$ equals 10:16. The method compares radio navigation geographic position of buoy 204 at time $t_2$ (geographic position 222) to radio navigation geographic position of buoy 204 at time $t_3$ (geographic position 224) and determines that buoy 204 has a latitude drift velocity of 0.0001 minutes per second (units of latitude per time) and a longitude drift velocity of 0.00013 minutes per second. The method extrapolates a radio navigation/drift estimated position of buoy 204 at time to or time $t_0$ (i.e., radio navigation/drift estimated position of geographic position 220) by multiplying drift velocities by elapsed time (i.e., $t_1$ subtracted from $t_2$) to estimate latitude and longitude displacements; and subtracting the estimated latitude and longitude displacements from a radio navigation estimate of geographic position 222. The DRNS position error (i.e., DRNS latitude/longitude error) is calculated by comparing the radio navigation/drift estimated position of buoy 204 at time to or time $t_1$ to a DRNS estimated geographic position of submarine 202 at time $t_0$. The DRNS correction factor has the same magnitude and opposite sign as and is determined from the DRNS position error. The DRNS correction factor can be added to a DRNS geographic position to obtain a calibrated DRNS geographic position or corrected submarine geographic position.

Referring to FIG. 1, at STEP 160 in flowchart 100, the method calculates a corrected submarine geographic position using a DRNS correction factor and a DRNS geographic position. In one embodiment, the method determines corrected submarine geographic positions by adding the DRNS correction factor to DRNS geographic positions. The DRNS correction factor provides a bias or offset that can be added to a DRNS geographic position to calculate a corrected submarine geographic position. Thus, the method calibrates internal navigation systems to correct for DRNS inaccuracies.

In one embodiment, the method uses a sole processing means (e.g., submarine navigation computer) for obtaining radio navigation positions, recording time events, calculating buoy drift, DRNS position errors, DRNS correction factors, DRNS geographic positions and corrected submarine geographic positions. In one embodiment, the method uses at least two processing means (e.g., submarine navigation computer and buoy computer) for obtaining radio navigation positions, recording time events, calculating buoy drift, DRNS position errors, DRNS correction factors, DRNS geographic positions and corrected submarine geographic positions. For example, the method uses a buoy computer for obtaining radio navigation positions and recording time events and a submarine navigation computer for calculating buoy drift, DRNS position errors, DRNS correction factors, DRNS geographic positions and corrected submarine geographic positions.

Figure 3:
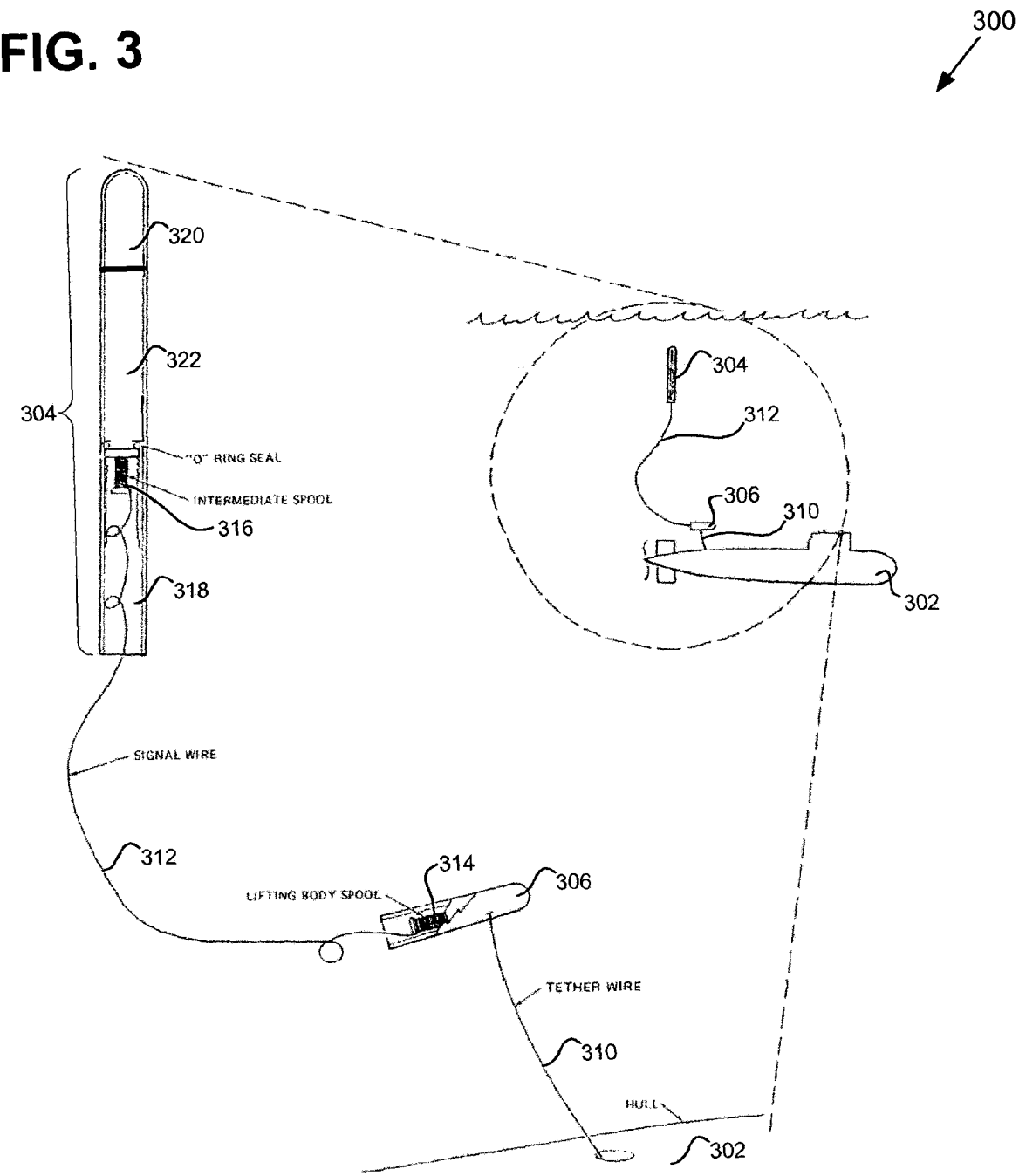
FIG. 3 is a pictorial illustration side view with expanded view of an exemplary submarine launched expendable GPS buoy in an intermediate stage of ascent.
Figure 4:
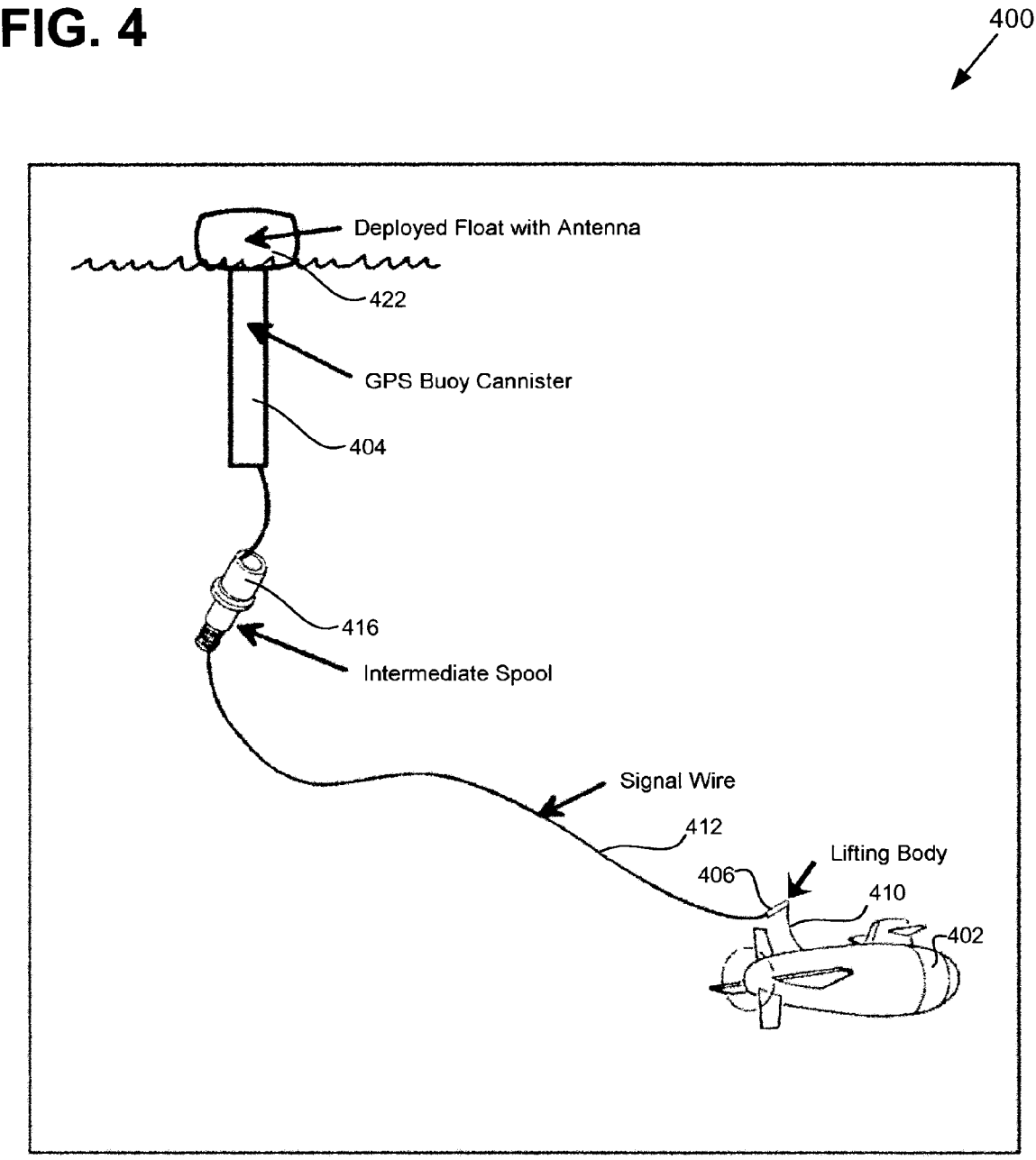
FIG. 4 is a pictorial illustration perspective view of an exemplary submarine launched expendable GPS buoy after breaching the water surface.
Figure 5:
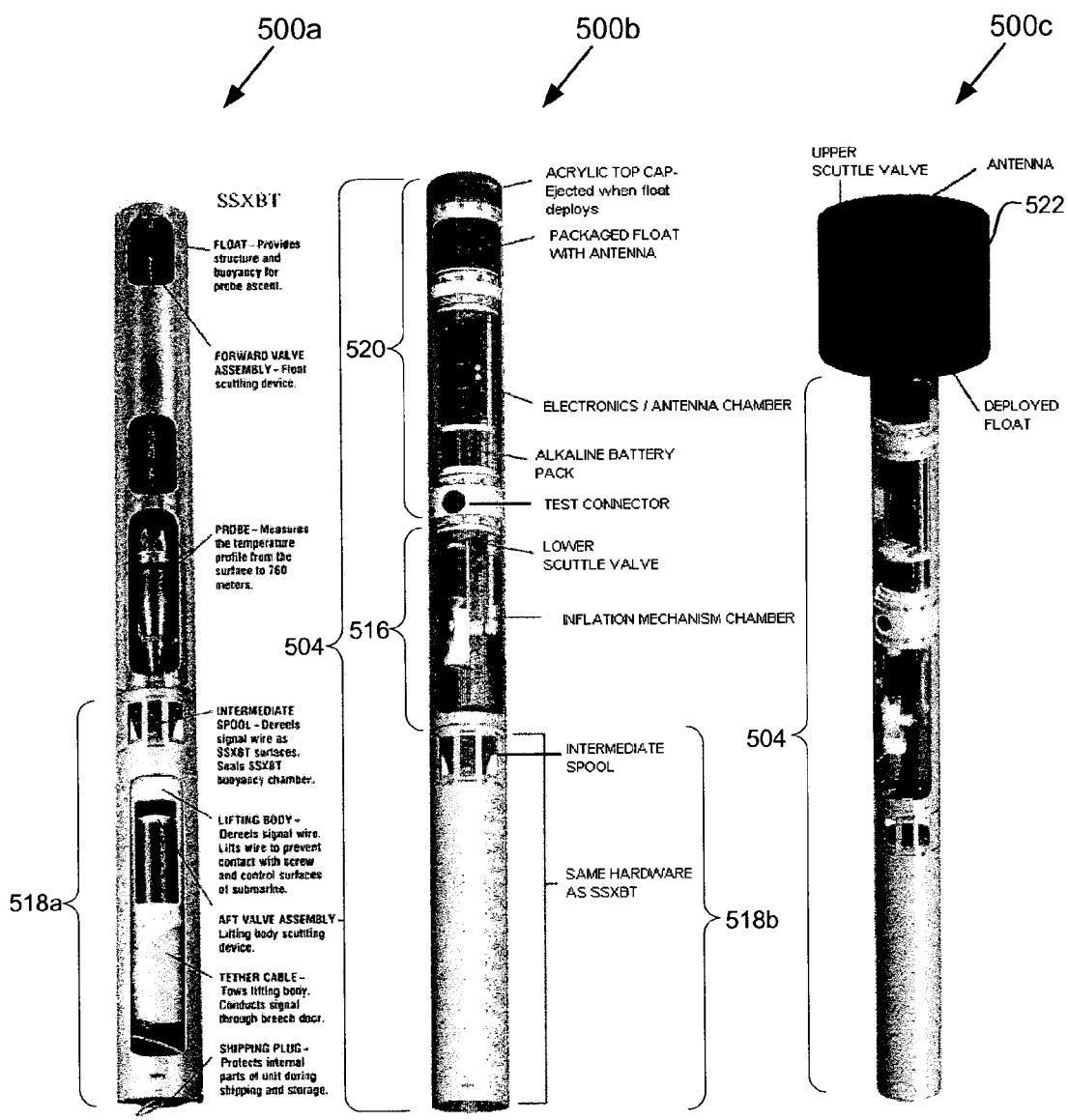
FIG. 5 is a set of pictorial illustrations of partial views of an exemplary SSXGPS buoy fabricated from a modified SSXBT buoy.

The submarine launched expendable radio navigation buoy system includes a submarine launched expendable radio navigation buoy and a navigation computer. In one embodiment, the submarine launched expendable radio navigation buoy system further includes a buoy computer. An exemplary submarine launched expendable radio navigation buoy system is a submarine launched expendable GPS buoy. FIGS. 3–5 are pictorial illustrations of exemplary submarine launched expendable GPS(SSXGPS) buoys.

FIG. 3 is a pictorial illustration side view with expanded view of an exemplary submarine launched expendable GPS (SSXGPS) buoy in an intermediate stage of ascent. As shown in pictorial illustration 300 of FIG. 3, the exemplary SSXGPS buoy includes tether wire 310, lifting body 306, signal wire 312 and GPS buoy canister 304. GPS buoy canister 304 includes signal wire housing 318, intermediate spool 316, inflation mechanism housing 322 and GPS electronics housing 320. Lifting body 306 includes lifting body spool 314. Prior to SSXGPS buoy launch, lifting body 306 is disposed within signal wire housing 318 of GPS buoy canister 304. Subsequent to SSXGPS buoy launch, lifting body 306 separates from GPS buoy canister 304; and hydrostatic pressure acting on intermediate spool 316 prevents inflation mechanism housing 322 from flooding. Submarine 302 tows lifting body 306 via tether wire 310. Lifting body spool 314 freely releases signal wire 312 as submarine 302 tows lifting body 306. In one embodiment, lifting body spool 314 includes approximately 5000 feet of signal wire 312. Intermediate spool 316 freely releases signal wire 312 as GPS buoy canister 304 ascends. In one embodiment, intermediate spool 316 includes approximately 1200 feet of signal wire 312. One of ordinary skill in the art shall recognize that means alternative to signal wire 312 and tether wire 310 can be used to operatively link buoy 304 and submarine 302 such as optical and acoustic links without departing from the scope and spirit of the present invention. As GPS buoy canister 304 ascends, hydrostatic pressure decreases. When buoy body 304 is relatively close to the water surface, intermediate spool 316 separates from inflation mechanism housing 322 of GPS buoy canister 304 due to decreased hydrostatic pressure. In one embodiment, a spring inside inflation mechanism housing 322 prevents flooding until hydrostatic pressure is decreased to a predetermined threshold. After inflation mechanism housing 322 floods, GPS electronics housing 320 is pressurized and a flotation bag is deployed. In one embodiment, a water-actuated $CO_2$ cartridge firing mechanism releases $CO_2$ gas from a $CO_2$ gas cartridge, which pressurizes GPS electronics housing 320 and deploys a flotation bag. GPS electronics housing 320 can include a buoy computer. In one embodiment, the buoy computer is capable of recording time events and obtaining GPS positions. In one embodiment, the buoy computer is capable of obtaining GPS positions and recording time events and a submarine navigation computer is capable of calculating buoy drift, submarine travel data, submarine offset position and estimated submarine GPS position. In one embodiment, GPS buoy canister 304 includes a DRNS. In one embodiment, submarine 302 includes a navigation computer operatively coupled to a sonar system capable of tracking GPS buoy canister 304 and determining buoy drift and buoy geographic displacement.

FIG. 4 is a pictorial illustration perspective view of an exemplary submarine launched expendable GPS buoy after breaching the water surface. As shown in pictorial illustration 400 of FIG. 4, the exemplary SSXGPS buoy includes tether wire 410, lifting body 406, signal wire 412, intermediate spool 416, GPS buoy canister 404, deployed float with antenna 422 and buoy computer (not shown in FIG. 4). Subsequent to breaching the water surface, the exemplary SSXGPS buoy searches for and receives GPS satellite RF signals. In one embodiment, the buoy computer is capable of recording GPS position acquisition time and subsequent GPS position update times and transmitting GPS position data and event times. In one embodiment, the buoy computer is further capable of recording time events such as buoy launch time and buoy breach time. In one embodiment, the exemplary SSXGPS buoy is capable of scuttling so that it sinks to preserve stealth requirements of military operations. Scuttling can occur upon command from the submarine, malfunction of the data link (e.g., a broken cable), or after a predetermined maximum time limit.

FIG. 5 is a set of pictorial illustrations of partial views of an exemplary SSXGPS buoy fabricated from a modified SSXBT buoy. An exemplary SSXBT buoy is described in detail in U.S. Pat. No. 5,046,359, issued on Sep. 10, 1991 to John Layport, which is hereby incorporated by reference in its entirety for its teachings on submarine launched buoys and carriers, and is referred to hereinafter as "Layport '359". The SSXBT buoy of Layport '359 can be modified to fabricate an exemplary SSXGPS buoy by replacing the bathythermograph systems of the SSXBT buoy with a GPS receiver/antenna and a flotation device. Pictorial illustration 500a of FIG. 5 shows an unmodified SSXBT buoy. As shown in pictorial illustration 500a, unmodified SSXBT buoy includes signal wire housing 518a. Pictorial illustration 500b of FIG. 5 shows an exemplary SSXGPS buoy fabricated from a modified SSXBT buoy. As shown in pictorial illustration 500b of FIG. 5, GPS buoy canister 504 includes signal wire housing 518b, which is substantially identical to signal wire housing 518a of pictorial illustration 500a, inflation mechanism chamber 516 and GPS electronics housing 520. Pictorial illustration 500c of FIG. 5 shows GPS buoy canister 504 and deployed float with antenna 522.

Figure 6:
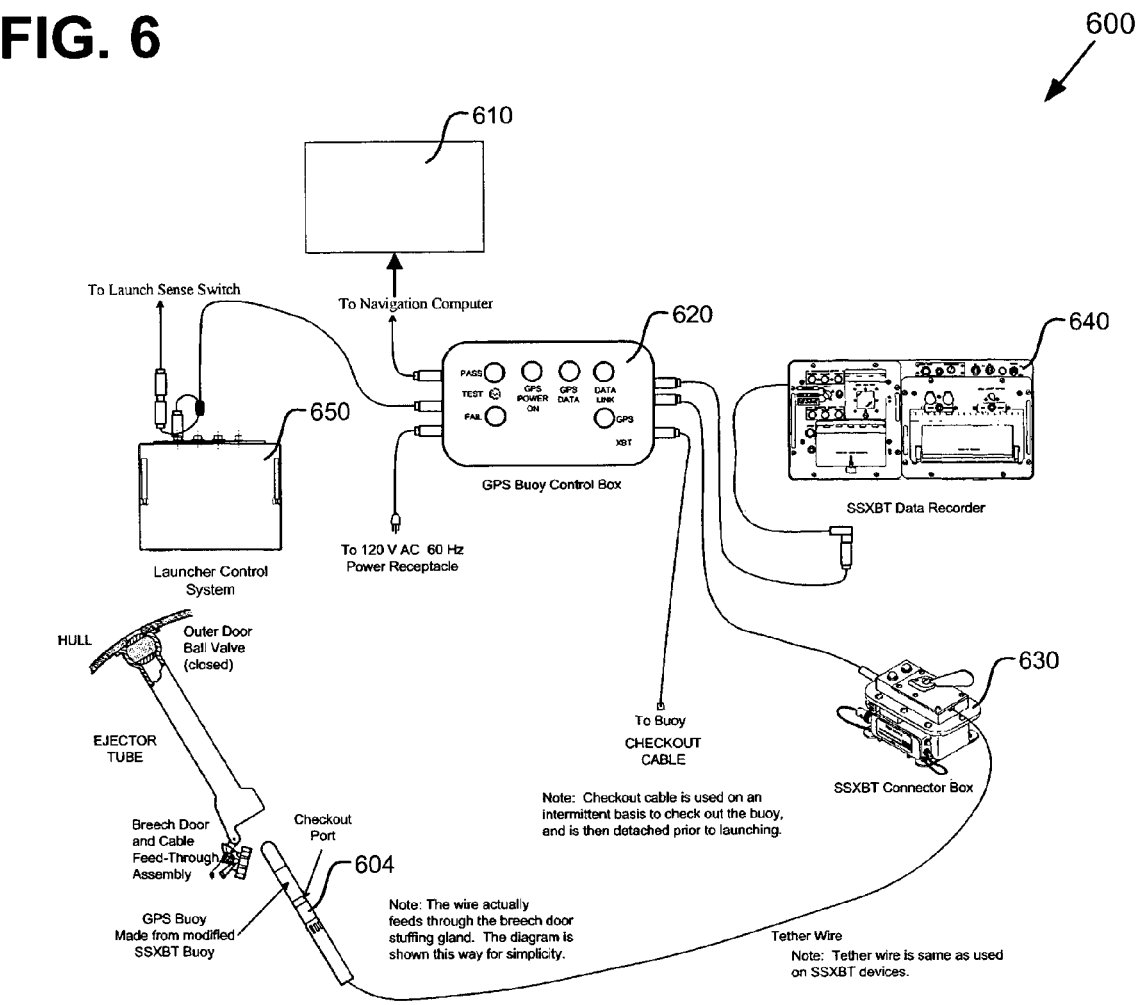
FIG. 6 is a block diagram of an exemplary submarine launched expendable GPS buoy system.

FIG. 6 is a block diagram of an exemplary submarine launched expendable GPS buoy system. The exemplary SSXGPS buoy system of FIG. 6 is fabricated by modifying a SSXBT buoy system. As shown in FIG. 6, exemplary SSXGPS buoy system 600 includes submarine launched expendable GPS buoy 604, navigation computer 610, GPS buoy control box 620, SSXBT connector box 630, SSXBT data recorder 640 and launch control system 650. SSXGPS buoy system 600 can operate in SSXBT mode or SSXGPS mode. When GPS buoy control box 620 is powered off, SSXGPS buoy system 600 operates in SSXBT mode. When GPS buoy control box 620 is powered on, SSXGPS buoy system 600 operates in SSXGPS mode. In SSXGPS mode, all connections to SSXBT connector box 630 are routed to GPS buoy control box 620. In SSXBT mode, all connections to SSXBT connector box 630 are routed to SSXBT recorder 640. System operators can control and monitor SSXGPS buoy system 600 through light indicators and switches on SSXBT connector box 630 and GPS buoy control box 620.

Navigation computer 610 receives information (e.g., system status, status messages and GPS data) via GPS buoy control box 620. Navigation computer 610 is capable of receiving event times and GPS positions from GPS buoy 604. Navigation computer 610 can calculate buoy drift, DRNS position errors, DRNS correction factors and corrected submarine geographic positions based on information received from GPS buoy 604 and DRNS of the submarine. Navigation computer 610 can provide corrected submarine geographic positions using GPS position data, buoy drift, DRNS position errors and DRNS correction factors. In one embodiment, navigation computer 610 is capable of obtaining GPS positions, recording time events, calculating buoy drift, DRNS position errors, DRNS correction factors, DRNS geographic positions and corrected submarine geographic positions. Prior to launch, system operators can test GPS buoy 604 by attaching a checkout cable. GPS buoy 604 is capable of searching for and receiving GPS satellite RF signals. GPS buoy 604 is also capable of recording time events such as buoy launch time, buoy breach time, GPS position acquisition time and subsequent GPS position update times and transmitting GPS position data and event times.

One of ordinary skill in the art shall recognize that exemplary SSXGPS buoys can be fabricated by modifying known submarine launched buoys without departing from the scope and spirit of the present invention. One such submarine launched buoy that can be modified to fabricate an exemplary SSXGPS buoy is a submarine launched sea-state buoy (SLSSB) described in detail in U.S. Pat. No. 4,794,575, issued on Dec. 27, 1988 to James Miller and is commonly assigned to the United States of America as represented by the Secretary of the Navy, which is hereby incorporated by reference in its entirety for its teachings on submarine launched buoys, and is referred to hereinafter as "Miller '575". The SLSSB of Miller '575 can be modified to fabricate an exemplary SSXGPS buoy by replacing the sea-state measuring device of the SLSSB with a GPS receiver/antenna and a flotation device such as GPS electronics housing 520 of FIG. 5.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A method for determining a submarine geographic position, the method comprising the steps of:
 a) launching a radio navigation-enabled buoy and recording a launch time and a DRNS geographic position estimate of said buoy, wherein said DRNS geographic position estimate is determined by a DRNS;
 b) recording a buoy breach time and searching for radio navigation signals of said buoy, wherein said buoy breach time is subsequent to said launch time;
 c) recording a radio navigation position acquisition time and an initial radio navigation position of said buoy, wherein said acquisition time is subsequent to said buoy breach time;
 d) recording a subsequent radio navigation position of said buoy and a subsequent time, wherein said subsequent time is subsequent to said radio navigation position acquisition time;
 e) determining a DRNS correction factor using a DRNS position error, a buoy drift, the recorded radio navigation positions of said buoy and DRNS position data of said buoy;

f) estimating said submarine geographic position using said DRNS correction factor and said DRNS geographic position estimate.

2. The method of claim 1, wherein said radio navigation-enabled buoy comprises a GPS-enabled buoy.

3. The method of claim 1, wherein said DRNS position error is determined by extrapolating a radio navigation/drift estimated geographic position of said radio navigation-enabled buoy at said buoy breach time using a radio navigation/drift position and said buoy drift and comparing said radio navigation/drift estimated geographic position of said radio navigation-enabled buoy at said buoy launch time to a launch time of said DRNS geographic position estimate of said submarine at said buoy launch time.

4. The method of claim 1, wherein said DRNS is an INS.

5. The method of claim 1, wherein said determining a DRNS correction factor comprises the following sub-steps:
   i) extrapolating a radio navigation/drift estimated geographic position of said radio navigation-enabled buoy at said buoy breach time using said recorded radio navigation positions and said buoy drift;
   ii) comparing said radio navigation/drift estimated geographic position of said radio navigation-enabled buoy at said buoy breach time to a DRNS estimated geographic position of said submarine at said buoy launch time;
   iii) determining said DRNS correction factor from said DRNS position error.

6. The method of claim 5, wherein said extrapolating a radio navigation/drift estimated geographic position of said radio navigation-enabled buoy at said buoy breach time comprises the following sub-steps:
   (1) determining said buoy drift by comparing said initial radio navigation position data to said subsequent radio navigation position and said radio navigation position acquisition time to said subsequent time;
   (2) extrapolating said radio navigation/drift estimated geographic position of said radio navigation-enabled buoy at said buoy breach time using said recorded radio navigation positions and said buoy drift.

7. The method of claim 5, wherein said extrapolating a radio navigation/drift estimated geographic position of said radio navigation-enabled buoy at said buoy breach time by the following sub-steps:
   (1) determining a latitude displacement and a longitude displacement by multiplying a latitude drift velocity by an elapsed time and a longitude drift velocity by said elapsed time, wherein said elapsed time equals a first event time subtracted from a second event time;
   (2) subtracting said latitude displacement and said longitude displacement to a navigation position of said buoy associated with said second event time.

8. The method of claim 7, wherein said first event time is said buoy breach time, and wherein said second event time is said radio navigation position acquisition time, and wherein said second event time is subsequent to said first event time.

9. The method of claim 1, wherein said buoy drift is represented by latitude/longitude displacement over time.

10. The method of claim 1, wherein said method is performed by a processing means.

11. The method of claim 10, wherein said processing means includes a submarine navigation computer.

12. The method of claim 10, wherein said processing means includes a buoy computer and a navigation computer.

13. A submarine launched radio navigation buoy system, comprising:
   a) a submarine launched radio navigation buoy, capable of:
      i) launching from a submerged submarine;
      ii) obtaining a plurality of radio navigation positions of said buoy from radio navigation RF signals and a plurality of corresponding event times;
      iii) transmitting said plurality of corresponding event times and said plurality of radio navigation positions;
   b) a processing means, operatively coupled to said submarine launched radio navigation buoy, capable of:
      i) receiving said plurality of corresponding event times and said plurality of radio navigation positions of said buoy;
      ii) determining a DRNS correction factor using a DRNS position error, a buoy drift, said radio navigation positions and DRNS position data of said buoy;
      iii) estimating a submarine geographic position using said DRNS correction factor and a DRNS geographic position of said buoy.

14. The submarine launched radio navigation buoy system of claim 13, wherein said submarine launched radio navigation buoy is a GPS-enabled buoy.

15. The submarine launched radio navigation buoy system of claim 13, wherein said DRNS position error is determined by extrapolating a radio navigation/drift estimated geographic position of said radio navigation-enabled buoy at said buoy breach time using a radio navigation/drift position of said buoy and said buoy drift and comparing said radio navigation/drift estimated geographic position of said radio navigation-enabled buoy at said buoy breach time to a DRNS estimated geographic position of said submarine at said buoy launch time.

16. The submarine launched radio navigation buoy system of claim 13, wherein said processing means determines DRNS correction factor comprises the following sub-steps:
   i) extrapolating a radio navigation/drift estimated geographic position of said radio navigation-enabled buoy at said buoy breach time using said radio navigation positions and said buoy drift;
   ii) comparing said radio navigation/drift estimated geographic position of said radio navigation-enabled buoy at said buoy breach time to a DRNS estimated geographic position of said submarine at said buoy launch time;
   iii) determining said DRNS correction factor from said DRNS position error.

17. The submarine launched radio navigation buoy system of claim 16, wherein said processing means extrapolates a radio navigation/drift estimated geographic position of said radio navigation-enabled buoy at said buoy breach time by the following sub-steps:
   (1) determining a latitude displacement and a longitude displacement by multiplying a latitude drift velocity by an elapsed time and a longitude drift velocity by said elapsed time, wherein said elapsed time equals a first event time subtracted from a second event time;
   (2) subtracting said latitude displacement and said longitude displacement to a navigation position associated with said second event time.

18. A submarine launched radio navigation buoy system, comprising:
   a) means for launching a radio navigation-enabled buoy;
   b) means for recording a launch time, a DRNS geographic position estimate of said buoy, a buoy breach time, a radio navigation position acquisition time and a subsequent time, wherein said subsequent time is subsequent to said radio navigation position acquisition time, which is subsequent to said buoy breach time, which is subsequent to said launch time;

c) means for searching for and receiving radio navigation signals of said buoy;

d) means for recording an initial radio navigation position of said buoy and a subsequent radio navigation position of said buoy;

e) means for determining a DRNS correction factor using a DRNS position error, a buoy drift, the recorded radio navigation positions of said buoy and DRNS position data of said buoy;

f) means for estimating said submarine geographic position using said DRNS correction factor and a DRNS geographic position of said buoy.

19. A method for determining a submarine geographic position, the method comprising the steps of:

a) launching a radio navigation-enabled buoy and recording a launch time and a DRNS geographic position estimate of said buoy, wherein said DRNS geographic position estimate is determined by a DRNS;

b) recording a buoy breach time and searching for radio navigation signals of said buoy, wherein said buoy breach time is subsequent to said launch time;

c) recording a radio navigation position acquisition time and an initial radio navigation position of said buoy, wherein said acquisition time is subsequent to said buoy breach time;

d) determining a DRNS correction factor using a DRNS position error, a buoy drift, said recorded initial radio navigation position and DRNS position data of said buoy, wherein said buoy drift is received from a DRNS associated with said radio navigation-enabled buoy;

e) estimating said submarine geographic position using said DRNS correction factor and said DRNS geographic position estimate.

20. A method for determining a submarine geographic position, the method comprising the steps of:

a) launching a radio navigation-enabled buoy and recording a launch time and a DRNS geographic position estimate of said buoy, wherein said DRNS geographic position estimate is determined by a DRNS;

b) recording a buoy breach time and searching for radio navigation signals of said buoy, wherein said buoy breach time is subsequent to said launch time;

c) recording a radio navigation position acquisition time and an initial radio navigation position of said buoy, wherein said acquisition time is subsequent to said buoy breach time;

d) determining a DRNS correction factor using a DRNS position error, a buoy drift, said recorded initial radio navigation position and DRNS position data of said buoy, wherein said buoy drift is received from a sonar system capable of tracking said radio navigation-enabled buoy;

e) estimating said submarine geographic position using said DRNS correction factor and said DRNS geographic position estimate.

\* \* \* \* \*